(12) United States Patent
Subramanian et al.

(10) Patent No.: US 8,893,291 B2
(45) Date of Patent: Nov. 18, 2014

(54) SECURITY THROUGH METADATA ORCHESTRATORS

(71) Applicant: Samsung SDS Co., Ltd., Seoul (KR)

(72) Inventors: Lakshmi Subramanian, Karlsruhe (DE); Andreas Leicher, Frankfurt (DE); Won Young Kim, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 0 days.

(21) Appl. No.: 13/663,866

(22) Filed: Oct. 30, 2012

(65) Prior Publication Data
US 2014/0123296 A1    May 1, 2014

(51) Int. Cl.
*G06F 7/04* (2006.01)

(52) U.S. Cl.
USPC .......................................................... 726/26

(58) Field of Classification Search
USPC .......................................................... 726/26
See application file for complete search history.

(56) References Cited

U.S. PATENT DOCUMENTS

| | | | |
|---|---|---|---|
| 8,108,362 B2 * | 1/2012 | Hydrie et al. | 707/687 |
| 2009/0138486 A1 * | 5/2009 | Hydrie et al. | 707/10 |
| 2011/0022642 A1 * | 1/2011 | deMilo et al. | 707/805 |
| 2011/0145439 A1 * | 6/2011 | Chaturvedi et al. | 709/244 |
| 2012/0310762 A1 * | 12/2012 | Robbin et al. | 705/26.1 |
| 2012/0311069 A1 * | 12/2012 | Robbin et al. | 709/215 |
| 2013/0167253 A1 * | 6/2013 | Seleznev et al. | 726/29 |

* cited by examiner

*Primary Examiner* — Teshome Hailu
(74) *Attorney, Agent, or Firm* — Sughrue Mion, PLLC

(57) ABSTRACT

A method of obtaining a service from a second cloud domain, the method being performed by a first cloud domain, includes identifying the second cloud domain which provides the service from among a plurality of cloud domains by analyzing metadata parameters of the plurality of cloud domains, receiving an indication of data which is requested by the second cloud domain to perform the service, and transmitting the requested data along with metadata corresponding to the requested data to the second cloud domain.

19 Claims, 9 Drawing Sheets

SECURITY THROUGH METADATA ORCHESTRATORS

BACKGROUND

Apparatuses, methods, systems, and computer program products consistent with exemplary embodiments relate to cloud computing, and more particularly, to enabling secure inter-cloud data transfer using metadata orchestrators.

Recently, cloud computing technology has been developed as a useful way for individuals and businesses to store and transfer data across networks, such as the Internet. In the cloud environments, protection and security of data is of prime importance for data owners. Data owners often wish to transfer their data to other cloud systems in order to use the services provided by the other cloud systems. However, when data owned by a data owner is transferred to a cloud domain which is not under the control of the data owner, the data owner loses at least some control over the transferred data.

A significant development impacting the cloud computing environment relates to regulations and guidelines governing the classification of data for security purposes. For example, certain U.S. laws implement a system for expressing the security category, SC, of an information system. Additionally, the National Institute of Standards and Technology (NIST) has also provided certain guidelines which map various information types to security categories and which indicate appropriate security controls for the information types. However, since data owners typically lose at least some control of data when the data is transferred to other cloud systems, complying with these regulations and guidelines poses a challenge.

Accordingly, there is a need in the art for secure ways of transferring data between cloud systems. Additionally, there is a need in the art for data owners transferring data in the cloud computing environment to comply with regulations and guidelines.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

Exemplary embodiments relate to apparatuses, methods, systems, and computer program products to enable secure inter-cloud data transfer through the implementation of metadata orchestrators (MOs) in cloud systems.

Exemplary embodiments further relate to apparatuses, methods, systems, and computer program products to enable secure inter-cloud data through the implementation of a federation between the MOs of the various cloud domains, thereby enabling the MOs to obtain information related to data as required for various data events, where each MO in a cloud domain serves as a communication endpoint for that domain for many different types of interactions with other cloud domains that are part of the MO framework repository.

Exemplary embodiments further relate to apparatuses, methods, systems, and computer program products to identify fine grained classification entries in the metadata associated with the data.

Exemplary embodiments further relate to apparatuses, methods, systems, and computer program products to use metadata in cloud security contexts to report violations, avoid misuse, manage access control of data and enable restricted or selective authorization for data and metadata access.

According to an exemplary embodiment, there is provided a method of obtaining a service from a second cloud domain, the method being performed by a first cloud domain and including: identifying the second cloud domain which provides the service from among a plurality of cloud domains by analyzing metadata parameters of the plurality of cloud domains; receiving an indication of data which is requested by the second cloud domain to perform the service; and transmitting the requested data along with metadata corresponding to the requested data to the second cloud domain.

The method may further include registering with a metadata orchestrator framework repository.

The identifying of the second cloud domain may include identifying the second cloud domain by analyzing metadata parameters of a plurality of cloud domains which are registered with the metadata orchestrator framework repository.

The method may further include requesting the service from the second cloud domain, wherein the second cloud domain transmits the indication of the requested data in response to the requesting of the service.

The method may further include retrieving generic metadata corresponding to the requested data, wherein the generic metadata indicates information related to the requested data and which is independent of any cloud domain.

The generic metadata may include at least one of regular metadata which indicates at least one of authorship or last modification date of the requested data; or function specific metadata which indicates at least one of an access policy, history, compliance information, or data ownership information associated with the requested data.

The method may further include creating domain specific metadata based on domain specific metadata parameters of the second cloud domain, wherein the domain specific metadata indicates a rule to be followed by the second cloud domain with respect to the requested data.

The transmitting of the requested data along with the corresponding metadata may include transmitting the domain specific metadata, the generic metadata and the requested data to the second cloud domain.

The method may further include receiving a metadata update from the second cloud domain, wherein the metadata update indicates an update performed by the second cloud domain to the metadata.

The method may further include receiving a notification that the second cloud domain is experiencing a conflict due to the second cloud domain's inability to comply with the rule indicated by the domain specific metadata; resolving the conflict and generating conflict resolution instructions based on the resolved conflict; and transmitting the conflict resolution instructions to the second cloud domain.

The first cloud domain may own the metadata.

The registering may include registering using key-based cryptography.

The method may further include providing a list of security properties of the first cloud domain to the metadata orchestrator framework repository after performing the registering.

The security properties may include at least one of a location of data centers, a location of storage and/or a location of a server of the first cloud domain or software and platforms implemented by the first cloud domain.

According to another exemplary embodiment, a method of providing a service to a first cloud domain, the method being performed by a second cloud domain, includes: receiving a request from the first cloud domain to perform the service; determining data of the first cloud domain which is necessary to perform the service; transmitting an indication of the data to the first cloud domain; receiving the data along with metadata corresponding to the data from the first cloud domain; and providing the service based on the data and the metadata.

According to another exemplary embodiment, a metadata orchestrator residing in a first cloud domain includes: a processor; a storage; and an input/output unit, the storage storing instructions that enable the processor to carry out operations including: identifying a second cloud domain which provides a service from among a plurality of cloud domains by analyzing metadata parameters of the plurality of cloud domains; receiving an indication of data which is requested by the second cloud domain to perform the service; and transmitting the requested data along with metadata corresponding to the requested data to the second cloud domain.

According to another exemplary embodiment, a metadata manager residing in a second cloud domain includes: a processor; a storage; and an input/output unit, the storage storing instructions that enable the processor to carry out operations including: receiving a request from a first cloud domain to perform the service; determining data of the first cloud domain which is necessary to perform the service; transmitting an indication of the data to the first cloud domain; receiving the data along with metadata corresponding to the data from the second cloud domain; and providing the service based on the data and the metadata.

According to another exemplary embodiment, a metadata manager residing in a first cloud domain includes: a processor; an external metadata storage; and an input/output unit, the storage unit storing instructions that enable the processor to carry out operations including: identifying a second cloud domain which provides a service from among a plurality of cloud domains by analyzing metadata parameters of the plurality of cloud domains; receiving an indication of data which is requested by the second cloud domain to perform the service; retrieving metadata from the external metadata storage, the metadata corresponding to the requested data; and transmitting the requested data along with metadata corresponding to the requested data to the second cloud domain.

The first cloud domain may include one of a cloud consumer, a cloud provider, a cloud auditor, and a cloud broker, and the second cloud domain may include one of a cloud consumer, a cloud provider, a cloud auditor, and a cloud broker.

DETAILED DESCRIPTION

Figure 1:
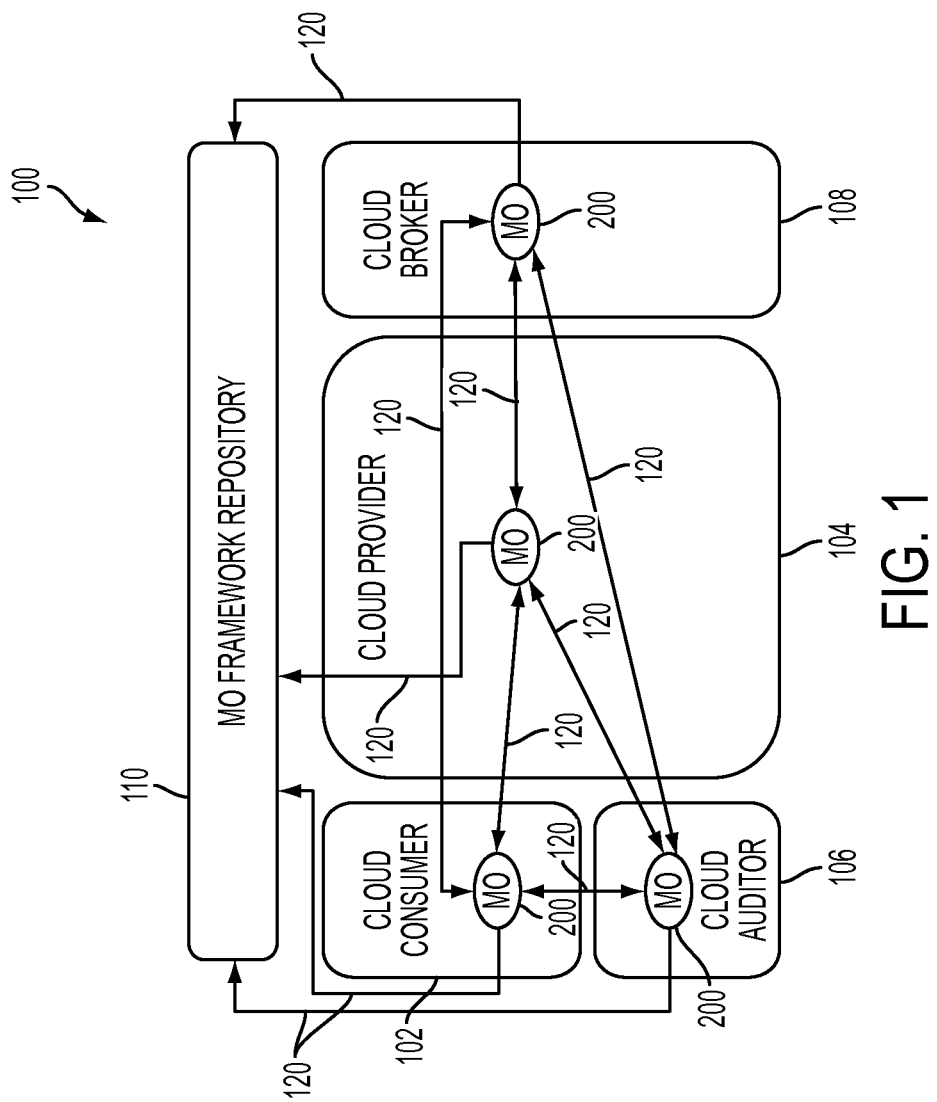
FIG. 1 illustrates a cloud computing federation according to an exemplary embodiment.

Embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Exemplary embodiments relate to a system level architecture, including entities and protocols which enable the use of metadata across multiple stakeholders in multi-cloud scenarios. Metadata refers to data about data. According to exemplary embodiments, metadata may be used to convey security information about data (e.g., confidentiality levels) as well as security restrictions (e.g., access rules).

Although the use of metadata is known in the related art, metadata usage to control security features of data when moving across multiple cloud domains is not known. Thus, exemplary embodiments relate to a novel approach of using metadata to control security features of data, including, in some exemplary embodiments, by implementing cloud-specific metadata. Furthermore, it is noted that exemplary embodiments have been developed independently from any specific platform, and thus, exemplary embodiments may be implemented in a broad variety of cloud platforms.

The value of the apparatuses, methods, systems, and computer program products according to exemplary embodiments can be seen from many different perspectives, including from a product development perspective and from a standardization perspective.

From a product development perspective, the apparatuses, methods, systems, and computer program products according to exemplary embodiments open up different opportunities to create differentiating factors from existing cloud platform offerings, when implemented. Furthermore, the value of such an offering may increase as the number of participants in the framework increases. All customers of the offered cloud platform can use the enhanced security features provided by the metadata orchestrators, for interactions with services in the same cloud platform, which creates a binding factor to the platform in addition to the service differentiator of providing this security feature. In addition, the metadata orchestrator and metadata manager entities may be created for other cloud platforms and offered as separate service and software offerings for integration into other cloud platforms. In addition, a repository framework server may provide services for registration and member management. This can be a separate product offering.

From a standardization perspective, value can be created by influencing leading industry standards, e.g., through presentations, discussions, demonstrations, contributions and participation in industry groups, with the goal to standardize the concept. Evangelization of exemplary embodiments may play a key role in successful standardization. Due to its platform independence, the framework according to exemplary embodiments can be standardized across all platforms.

As previously discussed in the background section, cloud customers can lose visibility and control of their data when the data is transferred to another cloud system, such as a cloud provider system. The metadata orchestrators according to exemplary embodiments enable cloud customers to extend their control over their data to another stakeholder's environment, thereby improving data security and protection. Additionally, the metadata orchestrators according to exemplary embodiments may be able to track the lifecycle of the data. Furthermore, the metadata orchestrators according to exemplary embodiments may be able to establish some level of access control in external cloud domains.

FIG. 1 illustrates a cloud computing federation according to an exemplary embodiment. As shown in FIG. 1, the cloud computing federation 100 includes several different types of cloud systems (also referred to as "clouds" or "cloud domains"), with each cloud system including a metadata orchestrator (MO) 200, and further includes a metadata orchestrator framework repository 110 (also referred to as "MO framework repository 110"). In the exemplary embodiment shown in FIG. 1, the different types of cloud systems include a cloud consumer 102, a cloud provider 104, a cloud auditor 106, and a cloud broker 108. Each of the cloud systems are interconnected to each of the other cloud systems and to the MO framework repository 110 via connections 120.

The cloud consumer 102 is an entity which stores user data and establishes a business relationship with, and uses services from, cloud providers. In an exemplary embodiment, the cloud consumer 102 is an Enterprise entity. Users (e.g., employees) of the Enterprise entity store data in storage units at the cloud consumer 102. The users of the cloud consumer 102 may access the cloud consumer 102 in various ways, for example, through a cloud provider interface accessible from a client computer or through a cloud broker interface. Access can also be provided in many other ways, according to the requirements of the Enterprise entity. When the cloud consumer 102 is an Enterprise entity, the MO 200 located in the cloud consumer 102 can be maintained by the Enterprise entity.

Figure 2:
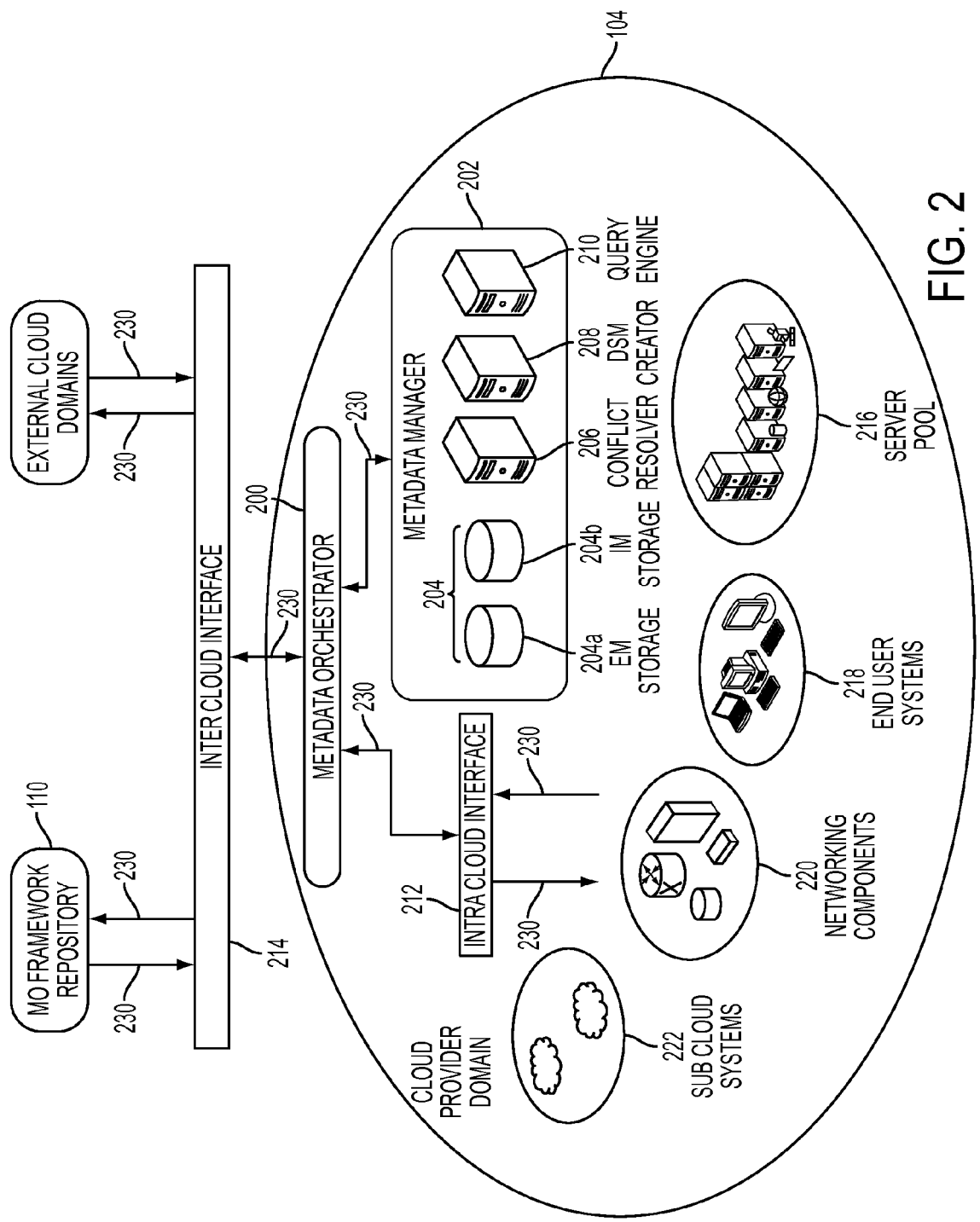
FIG. 2 illustrates a more detailed diagram of the cloud provider shown in FIG. 1.

It is noted that the cloud consumer 102 is not limited to being an Enterprise entity, and may alternatively or additionally be an individual Internet user or other type of individual or organization according to other exemplary embodiments. Furthermore, although only one cloud consumer 102 is depicted in FIG. 2, it is understood that many different cloud consumers 102 may be included in the cloud computing federation 100.

The cloud provider 104 is an entity which provides a service to the cloud consumer 102. The services offered by the cloud provider 104 can be many different types of services, and the cloud provider 104 typically charges the cloud consumer for these services. For example, the services offered by the cloud provider 104 may relate to analyzing, searching, or organizing data of the cloud consumer 102. According to an exemplary embodiment, the cloud provider 104 is implemented as at least one of a software as a service (SaaS) provider, a platform as a service (PaaS) provider, and an infrastructure as a service (IaaS) provider, or a combination thereof. When the cloud provider 104 is one of an IaaS or a PaaS provider, the cloud consumer 102 obtaining IaaS or PaaS services from the cloud provider 104 may have more control over data transferred to the cloud provider 104, as compared to a case when the cloud provider 104 is an SaaS provider. Therefore, when the cloud provider 104 is one of an IaaS or a PaaS provider, the cloud consumer 102 may be able to directly control a substantial quantity of the operations performed in the environment of the cloud provider 104, and the usage of the MOs 200 to exercise control in the environment of the cloud provider 104 may be relatively reduced. In contrast, when the cloud provider 104 is an SaaS provider, the cloud consumer 102 may have relatively less visibility and control over data transferred to the cloud provider 104, and therefore, the usage of the MOs 200 to exercise control in the environment of the cloud provider 104 may be relatively increased. The cloud provider 104 exercises control over the MO 200 operating in the domain of the cloud provider 104.

The cloud auditor 106 is an entity that is primarily used to execute independent third-party auditing of cloud services, information system operations, and performance and security of cloud implementations. For example, the cloud auditor 106 may audit the services provided by the cloud provider 104. The cloud auditor 106 exercises control over the MO 200 operating in the domain of the cloud auditor 106.

The cloud broker 108 is an entity that functions as an intermediary between the cloud consumer 102 and the cloud provider 104. The cloud broker 108 may perform many different types of intermediary functions, including the use, performance and delivery of cloud services. The cloud broker 108 may perform technical functions, such as providing interfaces to enable communications between the cloud consumer 102 and the cloud provider 104. The cloud broker 108 may also perform legal functions, such as negotiating relationships between the cloud consumer 102 and the cloud provider 104. The cloud broker 108 exercises control over the MO 200 operating in the domain of the cloud broker 108.

Each of the cloud domains, including the cloud consumer 102, the cloud provider 104, the cloud auditor 106, and the cloud broker 108 may be data owners. It is also possible according to exemplary embodiments that multiple cloud domains (e.g., the cloud consumer 102 and the cloud broker 108) have ownership of the same data. Generally, ownership of the data may remain constant until ownership rights are transferred by the entity which owns the data. Also, each of the cloud domains, including the cloud consumer 102, the cloud provider 104, the cloud auditor 106, and the cloud broker 108 may have metadata corresponding to the data owned by the respective cloud domain. In an exemplary embodiment, this metadata has generic and cloud domain specific portions, with certain defined fields for both portions.

The metadata orchestrator (MO) 200 is implemented as an apparatus which functions as an endpoint for metadata-related communications between the various cloud domains which are registered with the MO framework repository 110. As shown in FIG. 1, a MO 200 may reside in each of the different cloud domains 102, 104, 106 and 108. Each MO 200 is configured to function as an interface for any metadata related requests from external cloud domains or the MO framework repository 110 (inter-cloud requests), as well as metadata related requests from inner cloud components (e.g., from an intra-cloud interface). The MO 200 also interacts with the metadata manager which is configured to invoke various different types of functional units, such as metadata storage, a conflict resolver, and a domain specific metadata creator, to process metadata requests, as will be described later with reference to FIG. 2.

The MO 200 is responsible for establishing metadata related processes within its own cloud domain and executing the established processes by communicating with the MOs 200 of other cloud domains. By implementing the MOs 200 in the cloud domains, a more secure cloud computing environment can be achieved.

In an exemplary embodiment, the MO 200 is configured as a combination of hardware components and software components and includes processors and other circuitry to establish metadata related processes.

As shown in FIG. 1, in addition to interacting with the MO framework repository 110, the MOs 200 in each of the cloud domains 102, 104, 106 and 108 are also connected to each other by connections 120. As a result, the MOs 200 can interact with each other to exchange relevant metadata information, including generic and cloud domain specific metadata portions and other messages for resolving metadata issues.

When data moves from a first cloud domain (e.g., cloud consumer 102) to a second cloud domain (e.g., cloud provider 104), the corresponding metadata is also sent from the first cloud domain to the MO 200 of the second cloud domain. This metadata includes generic portions which include generic information about the data, as well as cloud domain specific portions which function as guidelines and conditions for handling the data in the second cloud domain. Furthermore, the cloud domain which actually owns the data, in this case, the first cloud domain, may, according to certain exemplary embodiments, add additional metadata, and there may be situations where the MOs 200 of other cloud domains, such as the second cloud domain, authenticate and connect to the MO 200 of the ownership domain to retrieve certain additional information.

In the process of handling the transferred data at the second cloud domain, several situations are possible. A first situation is that the second cloud domain has complied with all the guidelines and conditions specified by the domain specific metadata, and as a result, processing of the data and corresponding metadata takes place very smoothly. A second situation is that the second cloud domain is unable to comply with at least one of the guidelines and conditions specified by the domain specific metadata, and as a result, the second cloud domain will need additional instructions regarding how to process the data. In either situation, the MO 200 of the second cloud domain may interact with the MO 200 of the first cloud domain. For example, in the first situation, the MO 200 in the second cloud domain may wish to inform the MO 200 in the first cloud domain that the MO 200 in the second cloud domain is going to perform updates to the metadata based on the processing of the data. As another example, in the second situation, the MO 200 in the second cloud domain may wish to inform the MO 200 in the first cloud domain that the MO 200 in the second cloud domain is unable to comply with at least one of the guidelines and conditions specified by the domain specific metadata, thereby raising a flag referring to the issue and asking for alternative solutions.

As these foregoing examples illustrate, there may be many different types of interactions between the MOs 200 within the different cloud domains to indicate the occurrence of events or obtain additional information related to the processing of data.

In an exemplary embodiment, the MO 200 that belongs to the cloud domain of the data owner (e.g., cloud consumer 104) has distinguished functions from the functions of the MOs 200 in the other cloud domains. For example, the MO 200 that belongs to the cloud domain of a data owner (e.g., cloud consumer 102) serves as a central repository of all of the metadata corresponding to all of the data owned by the data owner, and is configured to store a history of all of the metadata based on information received from its own domain and other domains. In contrast, a MO 200 that belongs to a cloud domain of an entity other than the data owner (e.g., cloud provider 104) is configured to make updates to the generic and domain specific metadata received from the data owner, and inform the data owner of the updates, as well as request additional information about the metadata, without having access to all of the metadata corresponding to all of the data owned by the data owner. According to other exemplary embodiments, both the MO 200 that belongs to the cloud domain of the data owner as well as the MO 200 that belongs to a cloud domain other than the cloud domain of the data owner may be granted full access to all of the metadata of the data owner, and therefore both MOs function as central repositories for the metadata. The various permissions granted to the MOs are flexible and not limited in any way.

According to exemplary embodiments, the MO framework repository 110 is a global registry for cloud domains which offer metadata orchestration services. In an exemplary embodiment, the MO framework repository 110 is connected to the cloud consumer 102, cloud provider 104, cloud auditor 106 and cloud broker 108 by the connections 120 and functions as a central entity to which the MOs 200 are able to register in an enrollment (registration) process. Once the MO 200 for a cloud domain is enrolled, other MOs 200 which are enrolled will be able to discover and communicate with the newly enrolled MO 200. Member entities of the MO framework repository 110 may be required to comply with several sets of rules, both on a technical and business level. A primary benefit achieved by the implementation of the MO framework repository 110 is to provide a federation service for metadata across all MOs 200.

According to exemplary embodiments, the process of enrolling a MO 200 in the MO framework repository 110 is as follows. According to exemplary embodiments, the registration process can utilize any kind of key-based encryption/cryptography, including, for example, public key, private key, ID-based key, etc. For example, each MO 200 enrolling into the MO framework repository 110 can be equipped with a credential, e.g., client secret, which can be a PKI/certificate-based authentication credential. For PKI/certificate-based registration, the MO framework repository 110 will check the validity of the certificate and check that the certificate comes from a trustworthy source. Once enrolled, a Uniform Resource Locator (URL) which functions as a communication endpoint of the registered MO 200 will be made available in the MO framework repository 110, so that other MOs 200 can discover and communicate securely with the new MO 200. The MO framework repository 110 then provides an endpoint (URL) which allows MOs 200 to query the communication endpoint and public key/certificate, based on the URL of the target domain. The query endpoints for member information can be made accessible via hypertext transfer protocol (HTTP) at a known resource location of a repository server, and can further be encrypted so that only authenticated members of the MO framework repository 110 can query the query endpoints.

When a new MO 200 registers in the MO framework repository 110, the new MO 200 may provide a list of metadata properties of the cloud domain associated with the new MO 200 to the MO framework repository 110, so that other MOs 200 know which metadata fields are supported by the target domain. Providing this kind of information upon registration into the MO framework repository 110 enables requesting MOs 200 to make informed decisions on metadata policies according to the capabilities of the target domain. As an example, such information can include the locations of data centers, locations of storage, locations of a server or servers, locations of software and platforms being used, etc. These locations of the cloud domain (e.g., locations of storage, location of servers) can be geographical locations or logical locations. So, for example, if a first cloud domain registered with the MO framework repository 110 provides information that the first cloud domain has data centers in Europe, the U.S., and Asia, a second cloud domain registered with the MO framework repository 110 can retrieve this information. Then, when the second cloud domain seeks to transfer data to the first cloud domain (e.g., to obtain a service offered by the first cloud domain), the second cloud domain can indicate to the first cloud domain, through rules set forth in domain specific metadata (DSM), that the data transferred to the first cloud domain has to remain in the data centers in Europe and Asia only.

Furthermore, since this type of information might change over time, the registering cloud domain may also allow other registered cloud domains to have access to the query engine 210 of the registering cloud domain through the MO 200 of the registering cloud domain, to enable the other registered cloud domains to be able to query such information directly and identify any changes. In this case, the registering domain may only provide a mapping of supported property categories and their respective URLs to the MO framework repository 110, instead of providing more specific details which may change from time to time. A scheme may be implemented to have a common understanding of the categories across all members of the MO framework repository 110.

According to exemplary embodiments, upon registering with the MO framework repository 110, the registering MO 200 also provides the set of metadata parameters supported by the registering MO 200, grouped as negotiable and non-negotiable parameters. After registering its authentication credentials, the registering MO 200 authenticates itself to the MO framework repository 110 and establishes a secured connection (e.g., using transport layer security (TLS)). The registering MO 200 then uses this TLS session to send the list of the supported metadata parameters to the parameter registration endpoint of the MO framework repository 110.

According to exemplary embodiments, the MO framework repository 110 is also configured to issue central notification services to all registered MOs 200. For example, the MO framework repository 110 may broadcast notifications to all registered MOs 200 (a "push" technique). Alternatively or in addition, the MO framework repository 110 may enable registered MOs 200 to retrieve notifications from a repository server (a "pull" technique). These notifications can include, for example, notifications indicating that a new cloud domain has registered.

The connections 120 which connect the MOs 200 to each other and to the MO framework repository 110 can be various types of wired and/or wireless connections, such as connections over the Internet, Local Area Network (LAN) connections, ethernet, a combination thereof, etc.

FIG. 2 illustrates a more detailed diagram of the cloud provider shown in FIG. 1. As shown in FIG. 2, the cloud provider 104 includes the MO 200, a metadata manager 202, an intra-cloud interface 212, an inter-cloud interface 214, a server pool 216, end user systems 218, networking components 220, and sub-cloud systems 222. Each of the components is connected to other components via connections 230. Although FIG. 2 exemplarily illustrates the cloud provider 104 as the entity having each of these components, it is understood that each of the other cloud domains may be configured to have these same components.

The metadata manager 202 is responsible for handling the metadata requests that are directed to the metadata manager 202 from the MO 200. The metadata manager 202 includes a metadata storage 204 which includes an external metadata (EM) storage 204a and an internal metadata (IM) storage 204b, a conflict resolver 206, a domain specific metadata creator 208, and a query engine 210. The information generated by these components is sent back to the MO 200.

The metadata storage 204 is divided into an external metadata (EM) storage 204a and an internal metadata (IM) storage 204b.

The IM storage 204b is configured to store the internal metadata associated with all the data that belongs to the same cloud domain to which the metadata manager 202 belongs to. The internal metadata stored in the IM storage 204b may be retrieved for any internal requirements within the same cloud domain. Further, the internal metadata may be used to derive the cloud domain specific metadata that is sent to other cloud domains when the corresponding data is sent.

The EM storage 204a is configured to store the external metadata associated with the data that is received from and owned by other domains. The external metadata includes generic portions indicating generic information about the data, as well as domain specific metadata portions that are used to ensure compliance with the domain specific metadata criteria that should be met for the data that flows into the cloud domain from the external domains. The updates and retrieval of the metadata from the EM storage 204a and the IM storage 204b occur based on commands from the metadata manager 204.

The conflict resolver 206 is configured to resolve conflicts that arise in external cloud domains. Domain specific metadata is used to specify certain guidelines or rules that should be followed when the data associated with the domain specific metadata moves from the ownership domain to another cloud domain. When the guidelines or conditions cannot be met, a conflict occurs, and the MO 200 of the external cloud domain establishes contact with the MO 200 of the data ownership domain to resolve the conflict. The MO 200 of the ownership domain then sends the request to resolve the conflict to the metadata manager 204, which then communicates with the conflict resolver 206. The conflict resolver 206 analyzes the conflict and then generates a single proposed solution, or a plurality of alternative proposed solutions, to resolve the problem. The conflict resolver 206 is further configured to retrieve additional relevant metadata, if necessary, from the IM storage 204b. The proposed solution or solutions generated by the conflict resolver 206 are transmitted to the external domain experiencing the conflict through communication of the MOs 200.

To analyze the conflict and propose a solution, the conflict resolver 206 may use many different techniques. For example, the conflict resolver 206 may include an index associating different types of conflicts with corresponding predetermined types of solutions. Alternatively, the conflict resolver 206 may implement an algorithm to determine a customized solution for each type of conflict on a case-by-case basis.

The domain specific metadata (DSM) creator 208 is configured to create DSM for the data that is to be sent to the external cloud domains. According to exemplary embodiments, the DSM creator 208 creates (generates) the DSM based on one or several inputs. For example, the DSM creator 208 may create the DSM based on an initial set of inputs which are obtained from the MO framework repository 110. More specifically, each cloud domain with a MO 200 which is registering with the MO framework repository 110 may provide certain preliminary information about rules or guidelines (also referred to as "metadata parameters" or "domain specific metadata parameters") enforced by the cloud domain registering with the MO framework repository 100, and this preliminary information may be used by the DSM creator 208 to create the DSM. As another example, the DSM creator 208 may also create the DSM by analyzing the sensitivity and security requirements of the data that needs to be moved to another cloud domain, and may further use legal regulations (e.g., HIPAA for medical records) to generate the DSM. Many other criteria may further be used to create the DSM.

The query engine 210 is configured to search the metadata storage 204 based on queries, and output a result of the search. For example, these queries may be received from external cloud domains requesting additional metadata. The query engine 210 may use many different kinds of search strategies to search for the requested information, for example, probabilistic, boolean, etc.

The intra-cloud interface 212 is configured to facilitate communication between various components located in the cloud domain 104. The intra-cloud interface 212 is configured to update metadata and retrieve metadata from the metadata storage 204.

The inter-cloud interface 214 is configured to facilitate communication between the cloud domain 104 and the MO framework repository 110 and external cloud domains. The inter-cloud interface 214 is configured to perform many different types of communications, such as, for example, registering the cloud domain 104 with the MO framework repository 110 by providing certain preliminary information about the cloud domain 104, so that other cloud domains registered with the MO framework repository 110 may access the preliminary information (e.g., to enable the other cloud domains to create DSM). Furthermore, the inter-cloud interface 214 is configured to retrieve information (e.g., preliminary information of other cloud domains) from the MO framework repository 110, to make associations with other cloud domains and also to start the creation of DSM. Moreover, the inter-cloud interface 214 is configured to receive requests from MOs 200 of external cloud domains requesting specific metadata from the cloud provider 104 and/or requesting updating of certain specific metadata fields, and transmit responses including retrieved metadata and status messages of updates. Furthermore, the inter-cloud interface 214 is configured to receive a request from an MO 200 of an external cloud domain requesting that the MO 200 of the cloud provider 104 resolve a conflict, and transmit a proposed solution or proposed solutions. Additionally, the inter-cloud interface 214 is configured to receive a request from an MO 200 of an external cloud domain requesting that the MO 200 of the cloud provider 104 send the MO 200 of the external cloud domain additional information, where the additional information can be located by the query engine 210, and transmit a response with the requested additional information. Many other types of interactions are also possible.

The server pool 216 includes a plurality of servers. The servers may be many different types, and may be configured to store data owned by the cloud provider 104, along with other types of information.

The end user systems 218 include various different types of components to enable users to access and control the data and metadata stored in the cloud provider 104. The end user systems 218 may include, for example, user computers which include input units (e.g., keyboards, touch screens, etc.), displays, etc.

The networking components 220 include many different types of networking components to enable secure communication throughout the cloud provider 104. For example, the networking components 220 may include routers, firewalls, modems, etc.

The sub-cloud systems 222 include systems which are contained within the domain of the cloud provider 104 and function as sub-systems, for example, LANs, etc.

Figure 3:
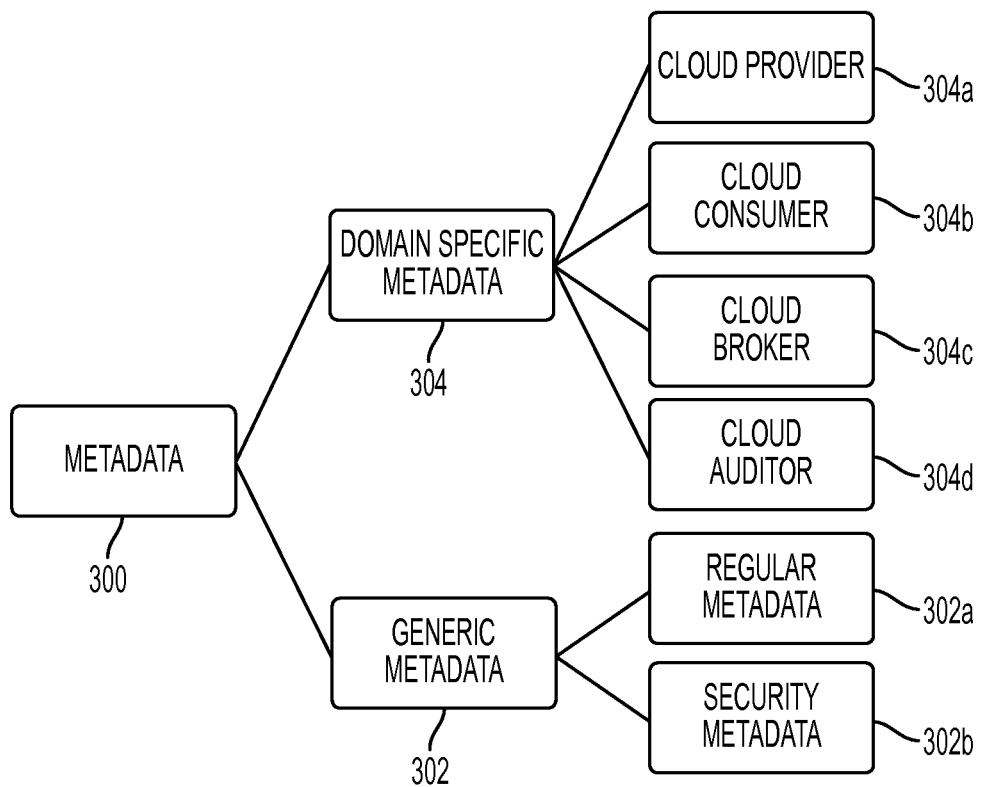
FIG. 3 illustrates metadata according to an exemplary embodiment.

FIG. 3 illustrates metadata according to an exemplary embodiment. As shown in FIG. 3, the metadata 300 includes generic metadata 302 and domain specific metadata (DSM) 304.

The generic metadata 302 includes generic information related to the corresponding data. The generic metadata 302 includes two different types of generic metadata: regular metadata 302a and function specific metadata 302b. The regular metadata 302a includes generic information about the corresponding data, such as author of the data, the last modification date of the data, details about the creation of the data, etc. According to an exemplary embodiment, the function specific metadata 302b is security metadata which includes security-related generic information about the corresponding data, such as an access policy associated with the corresponding data, metadata history, compliance information, data ownership information, etc. It is understood that security metadata is only one type of function specific metadata 302b, and that many other types of function specific metadata 302b may also be utilized in accordance with other exemplary embodiments.

The DSM 304 is data which includes rules or conditions which are generated based on specific information related to a specific cloud domain. According to exemplary embodiments, the different types of cloud domains are based on the NIST conceptual reference model, which discloses a conceptual reference model including a cloud provider, a cloud consumer, a cloud broker, and a cloud auditor. Thus, the DSM 304 includes four different types of DSM: cloud provider DSM 304a, cloud consumer DSM 304b, cloud broker DSM 304c, and cloud auditor DSM 304d. Each of the different types of DSM 304 are configured to comply with various parameters, including security classification, geographic location of data storage, information about different portions of the data, access permissions, etc.

The process of creating the metadata 300 may be implemented in many different ways. For example, when data which is owned by a cloud domain (e.g., cloud consumer 102) is recognized as data that may be of use in other cloud systems, then the creator or the current owner of the data may generate the metadata 300 that may be used appropriately in different domains, e.g., the DSM 304a for use in the cloud provider domain 104, the DSM 304c for use in the cloud broker domain 108, the function specific metadata 302b for use in all domains, etc.

According to exemplary embodiments, at any given point of time, the owner of the data has the highest level of access permissions to the data. The owner may designate further owners within the same cloud domain or in other cloud domains, thereby creating a chain of data owners who have the highest access permissions for the data. All important and critical metadata changes may be communicated to the data owner or data owners in the form of notifications to keep the data owner or data owners aware of any changes happening to the data. There may be certain metadata standards which can be customized as required to include cloud specific fields in the DSM portions of the metadata 300. According to exemplary embodiments, the metadata standards are based on at least one of the ISO/IEC 11179 Metadata Registry (MDR) standard and the ISO/IEC 19506 standard (also referred to as the "knowledge discovery metamodel") which is an ontology for describing software systems.

Figure 4A:
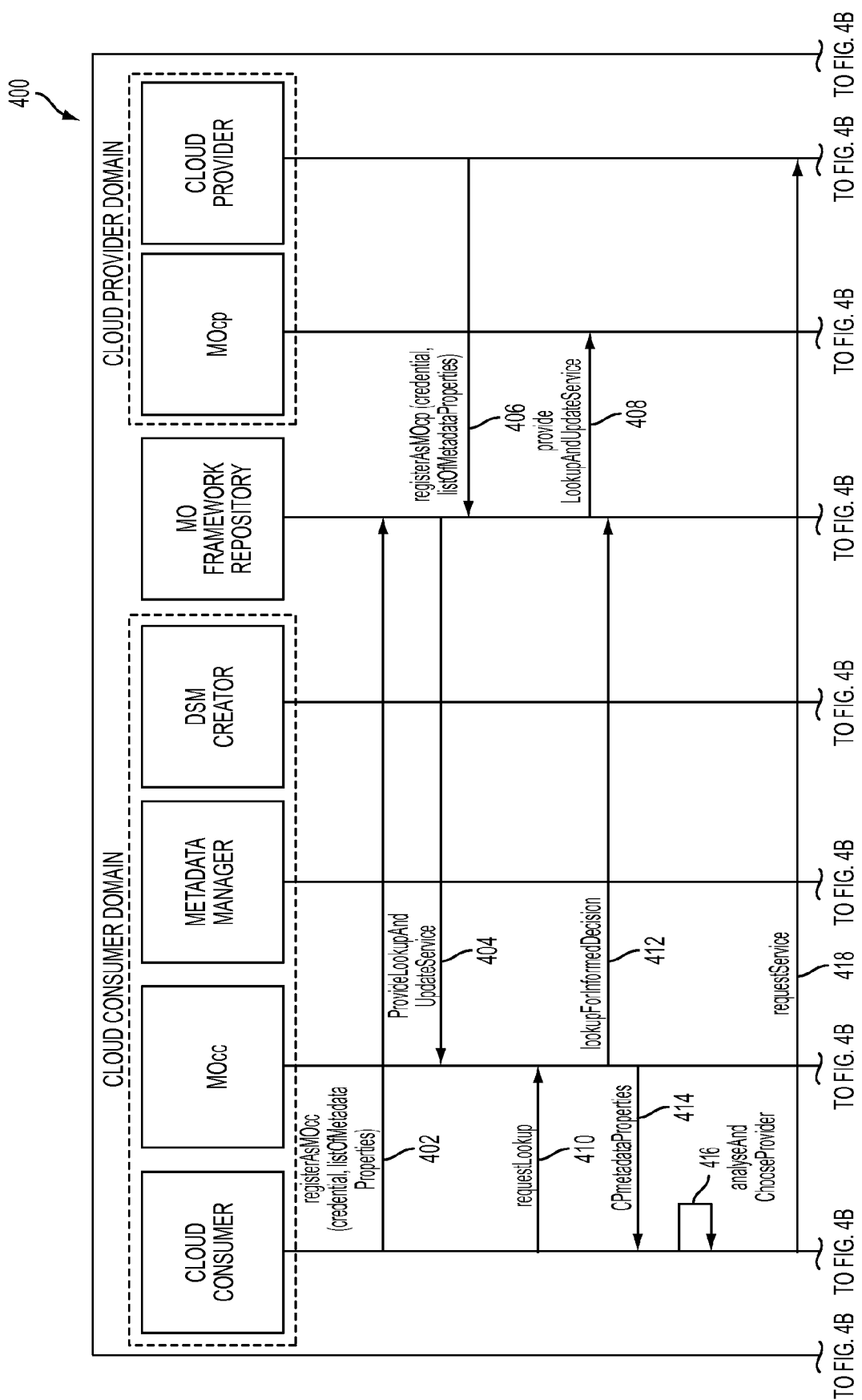
FIGS. 4A and 4B illustrate a method and an algorithm of registering with and using a metadata orchestrator framework repository according to an exemplary embodiment.
Figure 4B:
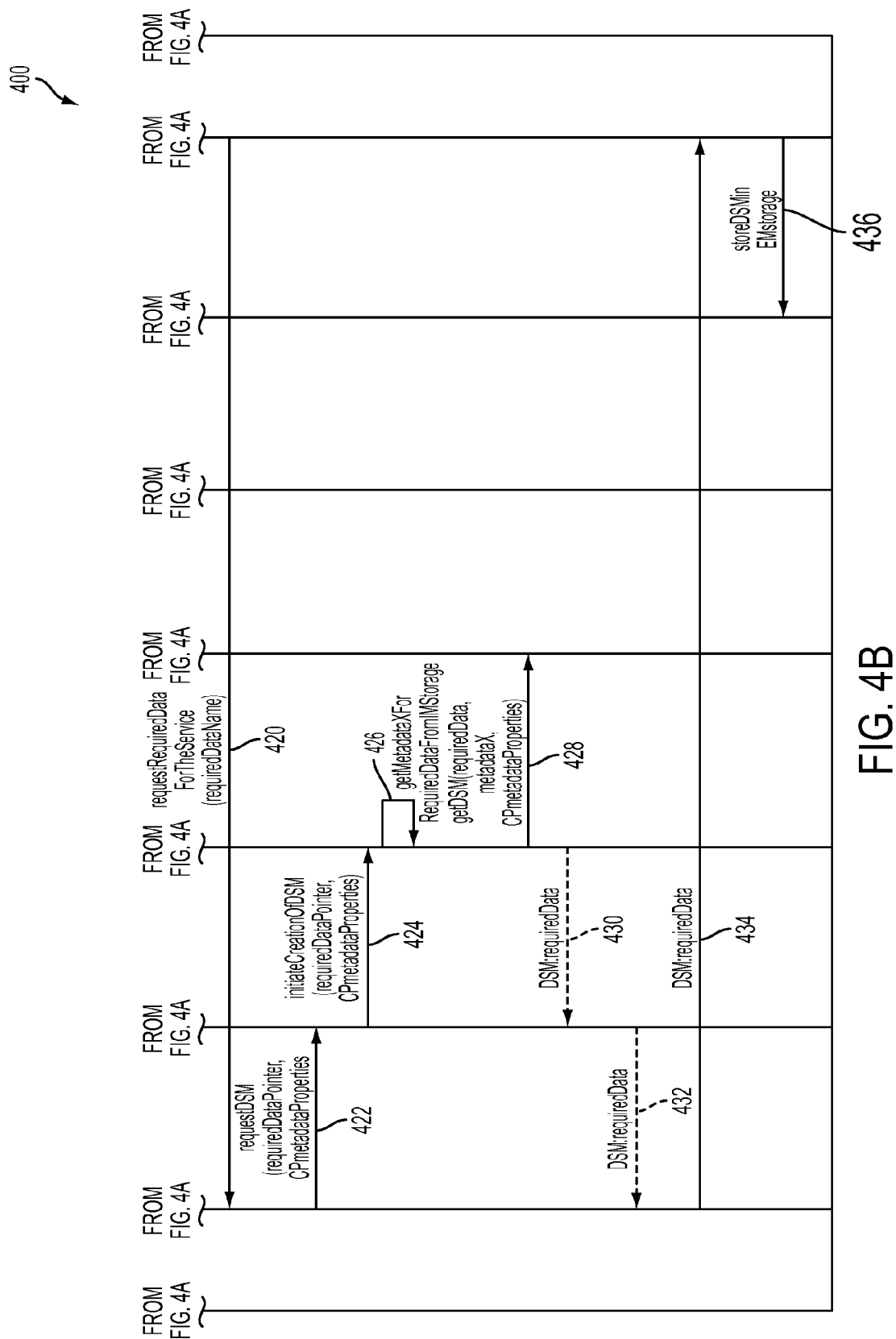

FIGS. 4A and 4B illustrate a method and an algorithm of registering with and using the MO framework repository 110 according to an exemplary embodiment. To better illustrate the method of FIGS. 4A-4B, it is assumed, by way of example only, that the cloud consumer 102 is a company that employs a group of employees, and the cloud consumer 102 wishes to outsource its payroll functions to the cloud provider 104 that offers a service to manage payroll functions. The cloud consumer 102 includes employee records which constitute the data, and which are owned by the cloud consumer 102. Each employee record includes biographical and job-related information about the employee (e.g., name, age, designation, payment scale, salary information, bank account information, health insurance information, etc.).

In operation 402, the cloud consumer 102 registers with the MO framework repository 110. During this registration process, the cloud consumer 102 registers using key-based cryptography. Furthermore, the cloud consumer 102 provides a list of metadata parameters indicating characteristics of the data processing abilities of the cloud consumer 102 (e.g., locations of data centers, software and platforms being used, etc.) to the MO framework repository 110, to enable other cloud domains to search for this information.

In operation 404, the MO framework repository 110 provides a lookup and update service to the MO 200 of the cloud consumer 102. The lookup and update service enables the cloud consumer 102 to search the MO framework repository 110 for other cloud providers that are registered with the MO framework repository 110 and that provide desired services, as well as update information of the cloud consumer 102.

In operation 406, the cloud provider 104 registers with the MO framework repository 110. The registration process may be, for example, a key-based cryptography registration process. The cloud provider 104 provides a list of metadata parameters about the cloud provider 104 to the MO framework repository 110. For example, the cloud provider 104 provides metadata parameters that indicate the cloud provider 104 has storage facilities for customer data located in the U.S., Germany, France, and the UK (negotiable), the cloud provider 104 has a data retention policy that customer data is backed up for one month after service provisioning (non-negotiable), and the cloud provider has 0 third party provider dependencies.

In operation 408, the MO framework repository 110 provides a lookup and update service to the cloud provider 104. Operation 408 may be implemented in substantially the same fashion as operation 404.

In operation 410, the cloud consumer 102 transmits a request to the MO 200 of the cloud consumer 102 requesting a lookup for a target cloud domain which provides a desired service. For example, an employee of the cloud consumer 102 uses the end user systems 218 to transmit a message to the MO 200, requesting a lookup for a target cloud domain which provides payroll functions.

In operation 412, the MO 200 of the cloud consumer 102 communicates with the MO framework repository 110 to initiate a lookup process to search for a target cloud domain matching the desired service. This operation may include, for example, communications in which the MO 200 of the cloud consumer 102 obtains metadata parameters of candidate target cloud domains from the MO framework repository 110.

In operation 414, the MO 200 of the cloud consumer 102 communicates with the cloud consumer 102 to initiate a process of analyzing the metadata parameters obtained in operation 412. For example, the MO 200 of the cloud consumer 102 transmits the metadata parameters to an end user for review.

In operation 416, the cloud consumer 102 analyzes the metadata parameters of the candidate target cloud domains and selects a target domain which matches the criteria of the cloud consumer 102. For example, an end user selects the cloud provider 104 as a target domain, based on various metadata parameters of the cloud provider 104.

In operation 418, the cloud consumer 102 requests the service from the cloud provider 104. For example, the cloud consumer 102 requests payroll functions from the cloud provider 104. During this operation 418, the cloud consumer 102 and the cloud provider 104 negotiate an agreement. This operation 418 may involve communications exchanged between the MOs 200 of the cloud consumer 102 and the cloud provider 104.

In operation 420, the cloud provider 104 requests the relevant data from the cloud consumer 102. For example, the cloud provider 104 requests the employee records from the cloud consumer 102. This operation 420 may involve communications exchanged between the MOs 200 of the cloud consumer 102 and the cloud provider 104.

In operation 422, the cloud consumer 102 identifies the data requested by the cloud provider 104, retrieves the requested data, and transmits a message to the MO 200 of the cloud consumer 102 requesting DSM 304 and generic metadata 302 corresponding to the requested data. For example, the cloud consumer 102 retrieves the data from the server pool 216.

In operation 424, the MO 200 of the cloud consumer 102 initiates the creation of the DSM 304 corresponding to the requested data. For example, the MO 200 transmits the metadata parameters of the cloud provider 104 to the metadata manager 202.

In operation 426, the metadata manager 202 retrieves the generic metadata 302 corresponding to the requested data. For example, the metadata manager 202 retrieves the generic metadata 302 from the internal metadata (IM) storage 204b.

In operation 428, the metadata manager 202 communicates with the DSM creator 208 to initiate the process of creating the DSM 304 for the requested data. The process of creating the DSM 304 is based on the metadata parameters of the cloud provider 104, and may also be based on other criteria. For example, based on the metadata parameters of the cloud provider 104, the DSM 304 is created to indicate a rule that the data to be transferred to the cloud provider 104 should be stored in the data storage location of the cloud provider 104 which is located in Germany, and in any event, the data should not leave Europe, and further indicates a rule that no third-party cloud provider services may be used for supplementary tasks. These rules are exemplary only, and many different types of rules or guidelines may be included with the DSM 304, based on many different types of DSM 304.

In operation 430, the metadata manager 202 transmits the data, the corresponding generic metadata 302, and the DSM 304 created in operation 428, to the MO 200 of the cloud consumer 102.

In operation 432, the MO 200 of the cloud consumer 102 transmits the data, the corresponding generic metadata 302, and the DSM 304 created in operation 428, to the cloud consumer 102. For example, the MO 200 transmits the information to an end user of the cloud consumer 102, for review. If, upon reviewing the information, the end user desires to know additional information about the cloud provider 104, the end user may initiate a process to obtain additional information from the cloud provider 104. For example, the end user may initiate a process in which the MO 200 of the cloud consumer 102 communicates with the MO 200 of the cloud provider 104 to obtain the additional information (e.g., by asking a query engine 210 at the cloud provider 104 to retrieve the additional information), and based on the additional information, additional DSM 304 including additional rules or guidelines may be generated. Alternatively, no additional information may be requested.

In operation 434, the cloud consumer 102 transmits the data, corresponding generic metadata 302, and corresponding DSM 304 to the cloud provider 104.

In operation 436, the cloud provider 104 receives the information transmitted in operation 434 and stores the information including the DSM 304. For example, the cloud provider 104 stores the generic metadata 302 and DSM 304 in an external metadata (EM) storage 204a at the cloud provider 104. The information may also include pointers pointing to the data. The conditions of data storage are retrieved from the DSM 304. For example, according to the DSM 304, the cloud provider 104 determines that the data must be stored in the data storage center in Germany, or in another data storage facility in Europe. Thus, the cloud provider 104 provides the service to the cloud consumer 102 according to the rules or guidelines implemented in the DSM 304.

Figure 5:
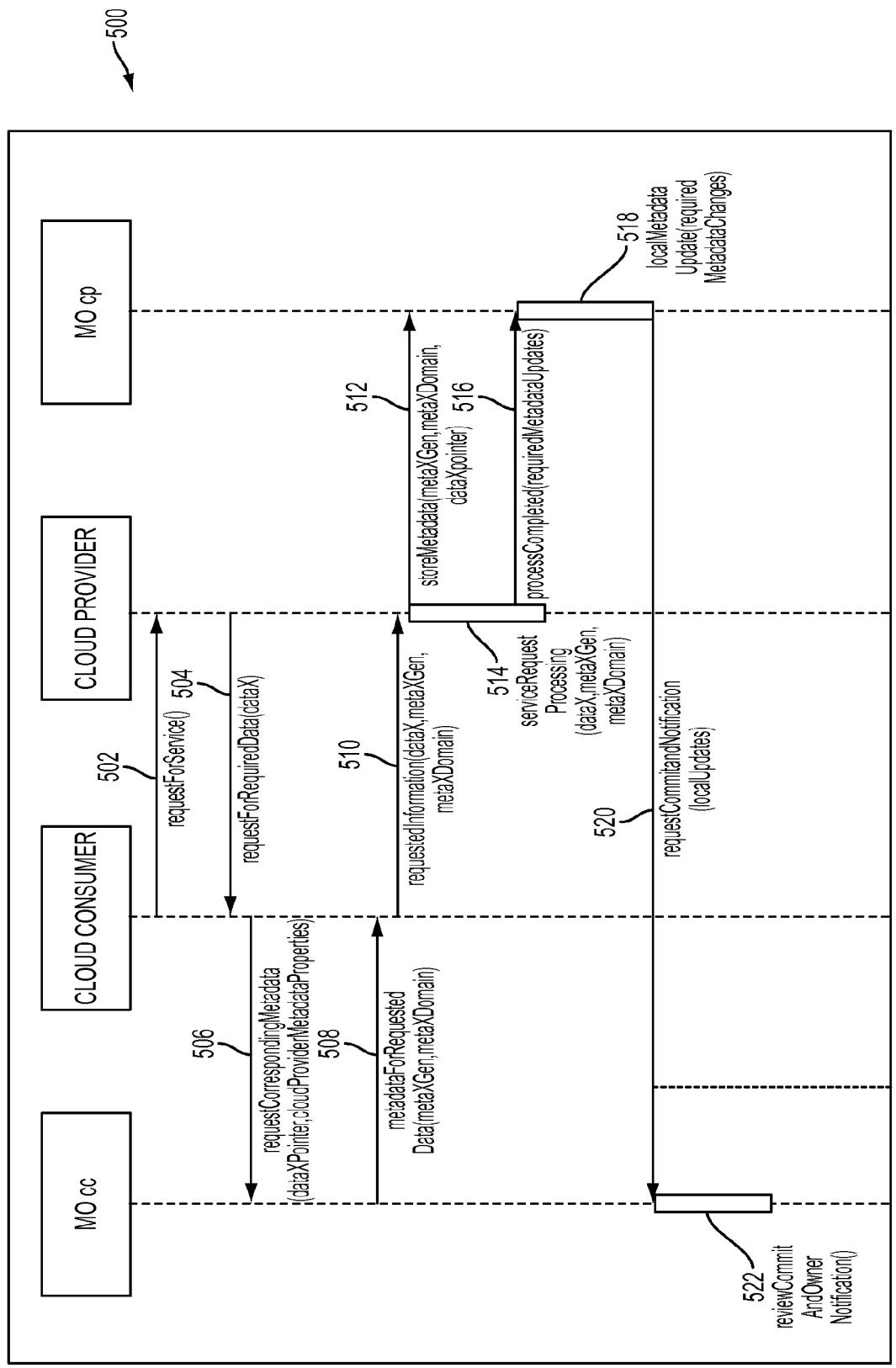
FIG. 5 illustrates a method and an algorithm of performing a metadata update according to an exemplary embodiment.

FIG. 5 illustrates a method and an algorithm of performing a metadata update according to an exemplary embodiment. To better illustrate the method of FIG. 5, the same non-limiting example provided above with respect to FIGS. 4A-4B is used.

In operation 502, the cloud consumer 102 requests a service from the cloud provider 104. This operation may be implemented in substantially the same fashion as operation 418 of FIG. 4A.

In operation 504, the cloud provider 104 requests data from the cloud consumer 102. This operation may be implemented in substantially the same fashion as operation 420 of FIG. 4B.

In operation 506, the cloud consumer 102 identifies the data requested by the cloud provider 104, retrieves the requested data, and transmits a message to the MO 200 of the cloud consumer 102 requesting DSM 304 and generic metadata 302 corresponding to the requested data. This operation may be implemented in substantially the same fashion as operation 422 of FIG. 4B.

In operation 508, the MO 200 of the cloud consumer 102 transmits the data, the corresponding generic metadata 302, and the corresponding DSM 304 created in operation 428, to the cloud consumer 102. This operation may be considered to be a combination of operations 422, 424, 426, 428, and 430 of FIG. 4B and may be implemented in substantially the same fashion as these operations.

In operation 510, the cloud consumer 102 transmits the data, corresponding generic metadata 302, and corresponding DSM 304 to the cloud provider 104. This operation may be implemented in substantially the same fashion as operation 434 of FIG. 4B.

In operation 512, the MO 200 of the cloud provider 104 stores the information received in operation 510. For example, the MO 200 stores the data in a server located according to a rule in the DSM 304, and stores the corresponding generic metadata 302 and DSM 304 in an EM storage 204a.

In operation 514, the cloud provider 104 processes the service request based on the data, the corresponding generic metadata 302, and the corresponding DSM 304. For example, the cloud provider 104 performs payroll functions on the data. During the processing of the service request, the data may or may not be updated.

In operation 516, the cloud provider 104 finishes processing the service request. According to this example, the processing finishes without any problems, and the cloud provider 104 determines that a permitted update to the data should be performed and notifies the MO 200 of the cloud provider 200 that a corresponding metadata update should be performed.

In operation 518, the MO 200 of the cloud provider 104 initiates a process to perform the corresponding metadata update.

In operation 520, the MO 200 of the cloud provider 104 transmits a notification to the MO 200 of the cloud consumer 102 indicating that the metadata update has been performed.

In operation 522, the MO 200 of the cloud consumer 102 reviews the notification received in operation 520. In this way, the owner of the data and corresponding metadata (e.g., cloud consumer 102) is notified of any updates to the metadata performed in other cloud domains, thereby achieving a more secure and visible inter-cloud computing environment.

Figure 6:
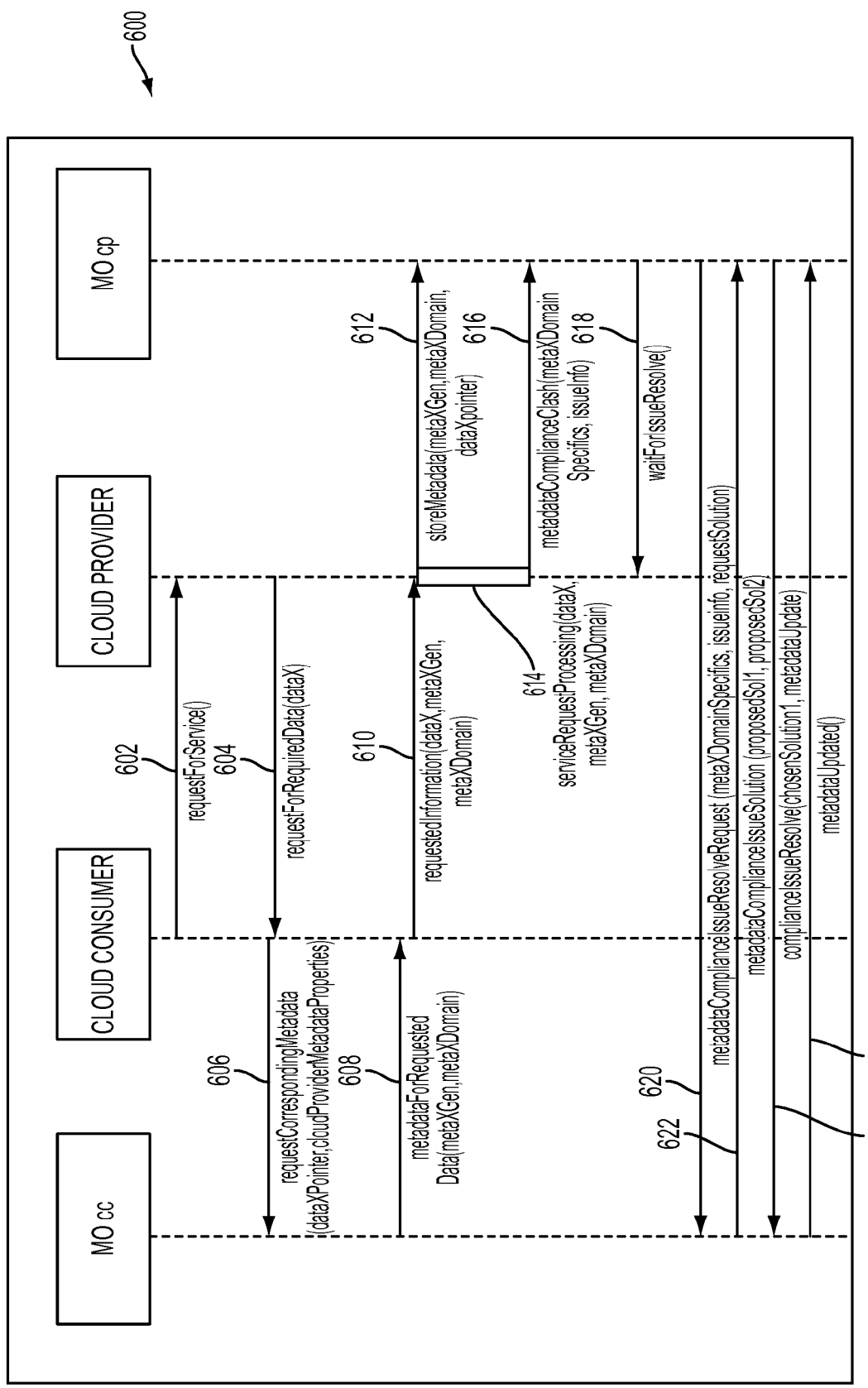
FIG. 6 illustrates a method and an algorithm of performing a conflict resolution process according to an exemplary embodiment.

FIG. 6 illustrates a method and an algorithm of performing a conflict resolution process according to an exemplary embodiment. To better illustrate the method of FIG. 6, the same example provided above with respect to FIGS. 4A-4B is used.

Operations 602, 604, 606, 608, 610, 612, and 614 may be implemented in substantially the same fashion as operations 502, 504, 506, 508, 510, 512, and 514 of FIG. 5, respectively.

In contrast to operation 516, in operation 616, the cloud provider 104 determines that the cloud provider 104 is unable to comply with each of the rules or guidelines specified by the DSM 304. For example, if all of the data storage centers in Europe are down, the cloud provider 104 determines that the cloud provider 104 is unable to comply with the rule set forth in the DSM 304 that the data of the cloud consumer 102 must be stored in a data storage center in Europe. As a result, the cloud provider 104 determines the existence of a conflict. Accordingly, the cloud provider 104 notifies the MO 200 of the cloud provider 104 about details of the conflict.

In operation 618, the MO 200 of the cloud provider 104 notifies other components in the cloud provider 104 which are in charge of processing the service request to stop processing the service request until the conflict is resolved.

In operation 620, the MO 200 of the cloud provider 104 notifies the MO 200 of the cloud consumer 102 about details of the conflict, and requests a proposed solution.

In operation 622, the MO 200 of the cloud consumer 102 transmits a proposed solution or a plurality of proposed solutions to the MO 200 of the cloud provider 104. To determine a proposed solution or solutions, the cloud consumer 102 uses the conflict resolver 206. The conflict resolver 206 may maintain criticality information indicating the criticality of the different domain specific conditions. For example, in the case of employee records, the criticality information may indicate that it is highly critical that the data storage location condition for the data is satisfied. Therefore, the conflict resolver 206 may determine, as a proposed solution, that the service provisioning should be delayed until the data centers in Europe are available. Alternatively, in the case of other types of data, the criticality information may indicate that it is not critical for the location condition for the data to be satisfied, and the conflict resolver 206 may determine, as a proposed solution, that the data center in the U.S. may be used. This proposed solution or solutions are then communicated from the MO 200 of the cloud consumer 102 to the MO 200 of the cloud provider 104.

In operation 624, the MO 200 of the cloud provider 104 notifies the MO 200 of the cloud consumer 102 that the conflict has been resolved according to the proposed solution or solutions, and further notifies the MO 200 of the cloud consumer 102 that the metadata should be updated to reflect any changes as a result of the conflict resolution process.

In operation 626, the MO 200 of the cloud consumer 102 notifies the MO 200 of the cloud provider 104 that the metadata has been updated.

As a result, according to the exemplary embodiment of FIG. 6, a data owner may use the MOs 200 to ensure that any conflicts arising from the processing of data by another cloud domain are resolved in a secure and efficient manner while maintaining a substantial amount of control over the data.

Furthermore, it is understood that the methods shown in FIGS. 4A, 4B, 5 and 6 are not limited to being performed between the cloud consumer 102 and the cloud provider 104, but may also involve the cloud auditor 106 and/or the cloud broker 108. For example, the cloud auditor 106 may be a data owner with a MO 200, and may wish to use a service provided by the cloud provider 104. In this case, the cloud auditor 106, instead of the cloud consumer 102, may interact with the cloud provider 104 to perform one or more of the methods shown in FIGS. 4A, 4B, 5 and 6. Similarly, the cloud broker 108 may be a data owner with a MO 200, and may wish to use a service provided by the cloud provider 104, in which case the cloud broker 108, instead of the cloud consumer 102, may interact with the cloud provider 104 to perform one or more of the methods shown in FIGS. 4A, 4B, 5 and 6. Furthermore, the cloud broker 108 may function as an intermediary between the cloud consumer 102 and the cloud provider 104, in which case the communications shown in FIGS. 4A, 4B, 5 and 6 may pass through the cloud broker 108.

Figure 7:
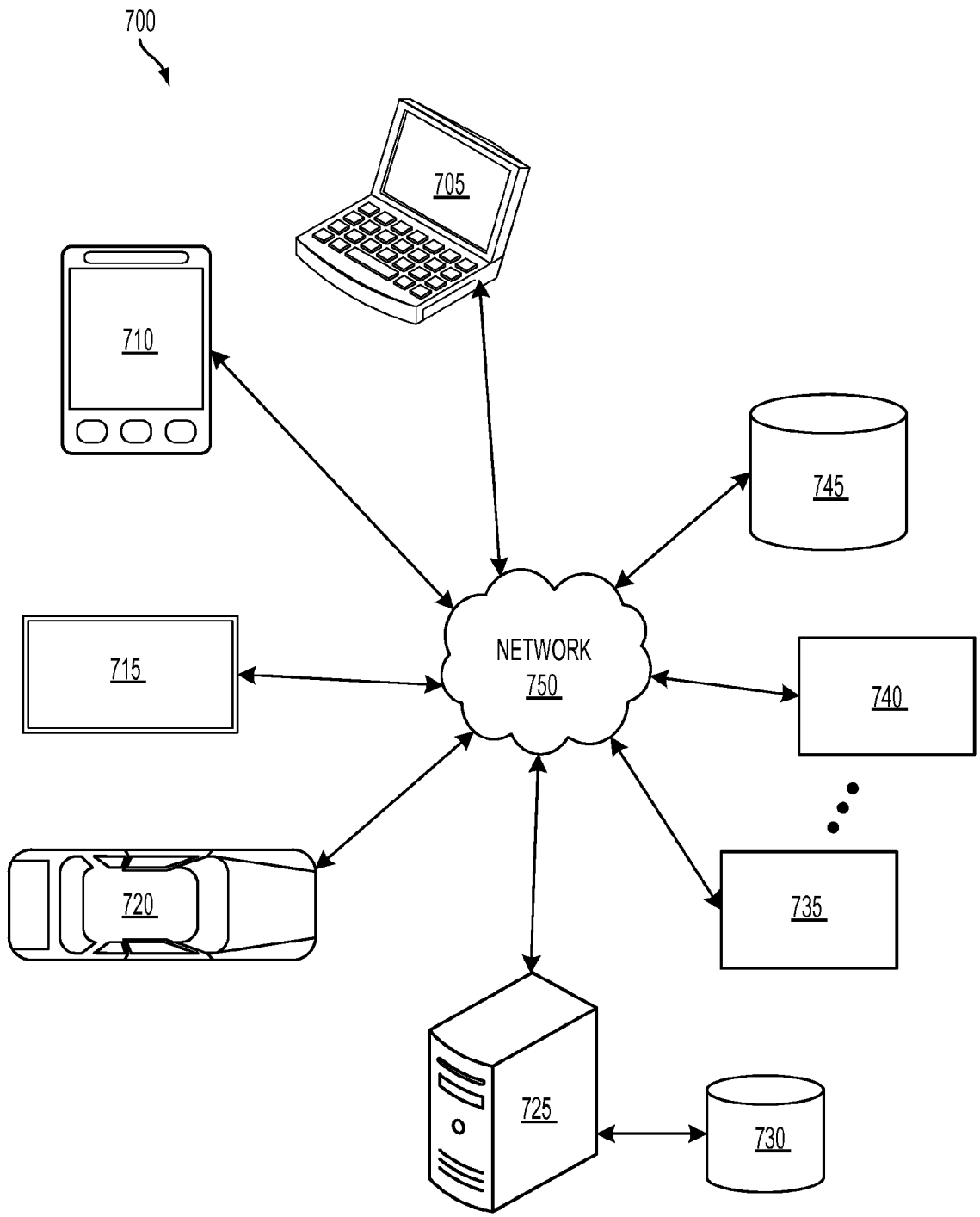
FIG. 7 shows an example environment suitable for some example implementations.

FIG. 7 shows an example environment suitable for some example implementations. Environment 700 includes devices 705-745, and each is communicatively connected to at least one other device via, for example, network 750 (e.g., by wired and/or wireless connections). Some devices may be communicatively connected to one or more storage devices 730 and 745.

The devices and/or services illustrated in FIGS. 1-2 and 4-6, for example, may be concretely implemented using one or more devices of the type shown at 705-745, and may interface with one or more such computing devices. Devices 705-745 may include, but are not limited to, a computer 705 (e.g., a laptop computing device), a mobile device 710 (e.g., smartphone or tablet), a television 715 with one or more processors embedded therein and/or coupled thereto, a device associated with a vehicle 720, a server computer 725, computing devices 735-740, and storage devices 730 (e.g., an attached storage device) and 745 (e.g., a network accessible storage device).

Although the exemplary embodiments mentioned above may appear to focus on services and operations that are today provided by high speed servers, the continuous advances in computing devices are foreseen to make it possible for such services and operations to be carried out between computing devices of types such as devices 705-720 which today are often thought of as user devices (e.g., devices used by users to access services and/or issue requests, such as on a network). Such user devices may provide a source for requests that initiate the need for communication between a data cloud and a service cloud.

Devices 725-745, on the other hand, are certainly appropriate for operations and services mentioned above, but could likewise provide a source for requests that initiate the need for communication between a data cloud and a service cloud. When carrying out the operations and services mentioned above, such devices may be more typically associated with service providers (e.g., used by service providers to provide services and/or store data, and carry out the operations such as those illustrated in FIGS. 4-6).

For example, a user may initiate a request for some type of information, for accessing, viewing, and/or sharing content using user devices 705 or 710. Such a request may travel through network 750 to a server such as devices 725 or 735-740 that support the MOs 200. The communications described above, such as those illustrated in FIGS. 4-6, may take place between devices such as 735-740. On the other hand, it is not required that the MOs 200 be supported only by devices such as 735-740, and the other devices shown in FIG. 7 may be used as is appropriate to the technical situation.

Figure 8:
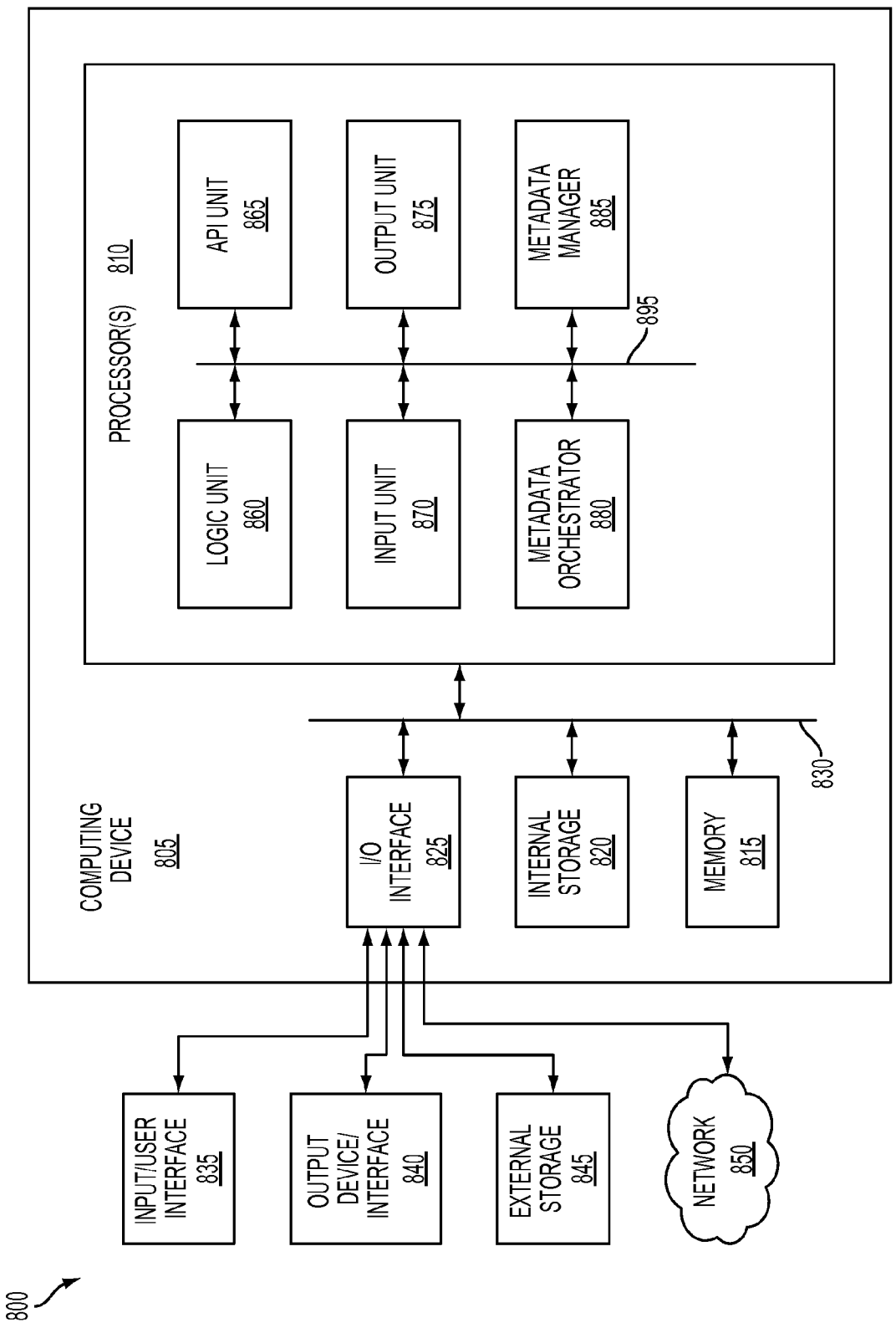
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers such as servers or rack-mounted devices, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, API unit 865, input unit 870, output unit 875, metadata orchestrator unit 880, metadata manager unit 885, and inter-unit communication mechanism 895 for the different units to communicate with each other, with the OS, and with other applications (not shown). For example, metadata orchestrator unit 880 and metadata manager unit 885 may implement one or more processes shown in the figures described previously. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, metadata orchestrator unit 880, and metadata manager unit 885). To carry out such an execution instruction, the processor(s) 810 must refer to a set of instructions stored in internal storage 820, memory 815, or external storage 845, and such a set of instructions are what enables the processor(s) 810 to carry out the operations intended by the information or execution instruction received by API unit 865.

In some instances, logic unit 860 may be configured to control the information flow among the units and direct the services provided by API unit 865, input unit 870, output unit 875, metadata orchestrator unit 880 and metadata manager unit 885 in some example implementations described above. For example, the flow of one or more processes or implementations may be controlled by logic unit 860 alone or in conjunction with API unit 865.

The various units just described may, in some exemplary embodiments, be implemented on the same computing equipment, or different computing equipment, as the technical situation directs.

In the exemplary embodiments shown in FIGS. 1-8 and discussed above, the terms "provider" (e.g., cloud provider 104) and "consumer" (e.g., cloud consumer 102) have been used to refer to two different cloud domains. These terms have been used for the sake of explanation only and are not intended to be terms of limitation. The exemplary embodiments may be applied to other types of cloud domains, such as, for example, "auditor" (e.g., cloud auditor 106) and "broker" (e.g., cloud broker 108) domains. More generally, it will be appreciated that the exemplary embodiments may be applied to any cloud domains at all, even between the same kind of cloud domains. Likewise, the data transfer and service provisioning described above can occur between or among any cloud domains, even between the same kind of cloud domains. For the sake of generality, it will be appreciated that the terms "first" and "second" cloud domains may be used with respect to any of the above exemplary embodiments, and that these terms merely distinguish one cloud domain from another without carrying any implication that the cloud domains have a specific type or different types.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method of obtaining a service from a second cloud domain, the method being performed by a first cloud domain and comprising:
   registering with a metadata orchestrator framework repository to connect to a plurality of cloud domains, which are registered with the metadata orchestrator framework repository, and obtain metadata parameters of the plurality of cloud domains;
   identifying the second cloud domain which provides the service from among the plurality of cloud domains by analyzing the metadata parameters of the plurality of cloud domains;
   receiving, from the second cloud domain, an indication of data which is owned by the first cloud domain and requested by the second cloud domain to perform the service;
   transmitting the requested data along with metadata corresponding to the requested data to the second cloud domain; and
   retrieving generic metadata corresponding to the requested data,
   wherein the generic metadata comprises:
   regular metadata which indicates at least one of authorship and last modification date of the requested data; and
   function specific metadata which indicates at least one of an access policy, history, compliance information, and data ownership information associated with the requested data, and
   wherein at least one of the registering, the identifying, the receiving, and the transmitting is performed by a processor.

2. The method according to claim 1, further comprising:
   requesting the service from the second cloud domain,
   wherein the second cloud domain transmits the indication of the requested data in response to the requesting of the service.

3. The method according to claim 1, wherein the generic metadata indicates information related to the requested data and which is independent of any cloud domain.

4. The method according to claim 3, further comprising:
   creating domain specific metadata based on domain specific metadata parameters of the second cloud domain based on information obtained through the metadata orchestrator framework repository, wherein the domain specific metadata indicates a rule to be followed by the second cloud domain with respect to the requested data.

5. The method according to claim 4, wherein the transmitting of the requested data along with the corresponding metadata comprises transmitting the domain specific metadata, the generic metadata and the requested data to the second cloud domain.

6. The method according to claim 4, further comprising:
receiving a notification that the second cloud domain is experiencing a conflict due to the second cloud domain's inability to comply with the rule indicated by the domain specific metadata;
resolving the conflict and generating conflict resolution instructions based on the resolved conflict; and
transmitting the conflict resolution instructions to the second cloud domain.

7. The method according to claim 1, further comprising:
receiving a metadata update from the second cloud domain, wherein the metadata update indicates an update performed by the second cloud domain to the metadata.

8. The method according to claim 1, wherein the registering comprises registering using key-based cryptography.

9. The method according to claim 1, further comprising, after performing the registering, providing a list of security properties of the first cloud domain to the metadata orchestrator framework repository to be shared with the plurality of cloud domains which are registered with the metadata orchestrator framework repository.

10. The method according to claim 9, wherein the security properties comprise at least one of a location of data centers, a location of storage and/or a location of a server of the first cloud domain or software and platforms implemented by the first cloud domain.

11. The method according to claim 1, wherein the first cloud domain comprises one of a cloud consumer, a cloud provider, a cloud auditor, and a cloud broker, and the second cloud domain comprises one of a cloud consumer, a cloud provider, a cloud auditor, and a cloud broker.

12. A method of providing a service to a first cloud domain, the method being performed by a second cloud domain and comprising:
receiving a request from the first cloud domain to perform the service;
determining data of the first cloud domain which is necessary to perform the service;
transmitting an indication of the data to the first cloud domain;
receiving the data along with metadata corresponding to the data from the first cloud domain; and
providing the service based on the data and the metadata,
wherein the first cloud domain is registered with a metadata orchestrator framework repository, through which the first cloud domain connects to the second cloud domain and obtains metadata parameters of the second cloud domain,
wherein the first cloud domain retrieves generic metadata corresponding to the data,
wherein the generic metadata comprises:
regular metadata which indicates at least one of authorship and last modification date of the data; and
function specific metadata which indicates at least one of an access policy, history, compliance information, and data ownership information associated with the data, and wherein at least one of the receiving, the determining, the transmitting, the receiving, and the providing is performed by a processor.

13. The method according to claim 12, wherein the first cloud domain comprises one of a cloud consumer, a cloud provider, a cloud auditor, and a cloud broker, and the second cloud domain comprises one of a cloud consumer, a cloud provider, a cloud auditor, and a cloud broker.

14. A metadata orchestrator residing in a first cloud domain, comprising:
a processor;
a storage; and
an input/output unit,
the storage storing instructions that enable the processor to carry out operations comprising:
registering with a metadata orchestrator framework repository to connect to a plurality of cloud domains, which are registered with the metadata orchestrator framework repository, and obtain metadata parameters of the plurality of cloud domains;
identifying a second cloud domain which provides a service from among the plurality of cloud domains by analyzing the metadata parameters of the plurality of cloud domains;
receiving, from the second cloud domain, an indication of data which is owned by the first cloud domain and requested by the second cloud domain to perform the service;
transmitting the requested data along with metadata corresponding to the requested data to the second cloud domain; and
retrieving generic metadata corresponding to the requested data,
wherein the generic metadata comprises:
regular metadata which indicates at least one of authorship and last modification date of the requested data; and
function specific metadata which indicates at least one of an access policy, history, compliance information, and data ownership information associated with the requested data.

15. The metadata orchestrator according to claim 14, wherein the first cloud domain comprises one of a cloud consumer, a cloud provider, a cloud auditor, and a cloud broker, and the second cloud domain comprises one of a cloud consumer, a cloud provider, a cloud auditor, and a cloud broker.

16. A metadata manager residing in a second cloud domain, comprising:
a processor;
a storage; and
an input/output unit,
the storage storing instructions that enable the processor to carry out operations comprising:
receiving a request from a first cloud domain to perform a service;
determining data of the first cloud domain which is necessary to perform the service;
transmitting an indication of the data to the first cloud domain;
receiving the data along with metadata corresponding to the data from the first cloud domain; and
providing the service based on the data and the metadata,
wherein the first cloud domain is registered with a metadata orchestrator framework repository, through which the first cloud domain connects to the second cloud domain and obtains metadata parameters of the second cloud domain, wherein the first cloud domain retrieves generic metadata corresponding to the data, and wherein the generic metadata comprises:

regular metadata which indicates at least one of authorship and last modification date of the data; and function specific metadata which indicates at least one of an access policy, history, compliance information, and data ownership information associated with the data.

17. The metadata manager according to claim 16, wherein the first cloud domain comprises one of a cloud consumer, a cloud provider, a cloud auditor, and a cloud broker, and the second cloud domain comprises one of a cloud consumer, a cloud provider, a cloud auditor, and a cloud broker.

18. A metadata manager residing in a first cloud domain, comprising:

a processor;

an external metadata storage; and an input/output unit, the storage unit storing instructions that enable the processor to carry out operations comprising:

registering with a metadata orchestrator framework repository to connect to a plurality of cloud domains, which are registered with the metadata orchestrator framework repository, and obtain metadata parameters of the plurality of cloud domains;

identifying a second cloud domain which provides a service from among the plurality of cloud domains by analyzing the metadata parameters of the plurality of cloud domains;

receiving, from the second cloud domain, an indication of data which is owned by the first cloud domain requested by the second cloud domain to perform the service;

retrieving metadata from the external metadata storage, the metadata corresponding to the requested data;

transmitting the requested data along with the metadata corresponding to the requested data to the second cloud domain; and retrieving generic metadata corresponding to the requested data, wherein the generic metadata comprises:

regular metadata which indicates at least one of authorship and last modification date of the requested data; and function specific metadata which indicates at least one of an access policy, history, compliance information, and data ownership information associated with the requested data.

19. The metadata manager according to claim 18, wherein the first cloud domain comprises one of a cloud consumer, a cloud provider, a cloud auditor, and a cloud broker, and the second cloud domain comprises one of a cloud consumer, a cloud provider, a cloud auditor, and a cloud broker.

* * * * *